Oct. 18, 1960     A. CHAPLIN ET AL     2,956,642
CAMSHAFT AND BEARING LUBRICATING MEANS
Filed Dec. 23, 1958     4 Sheets-Sheet 4
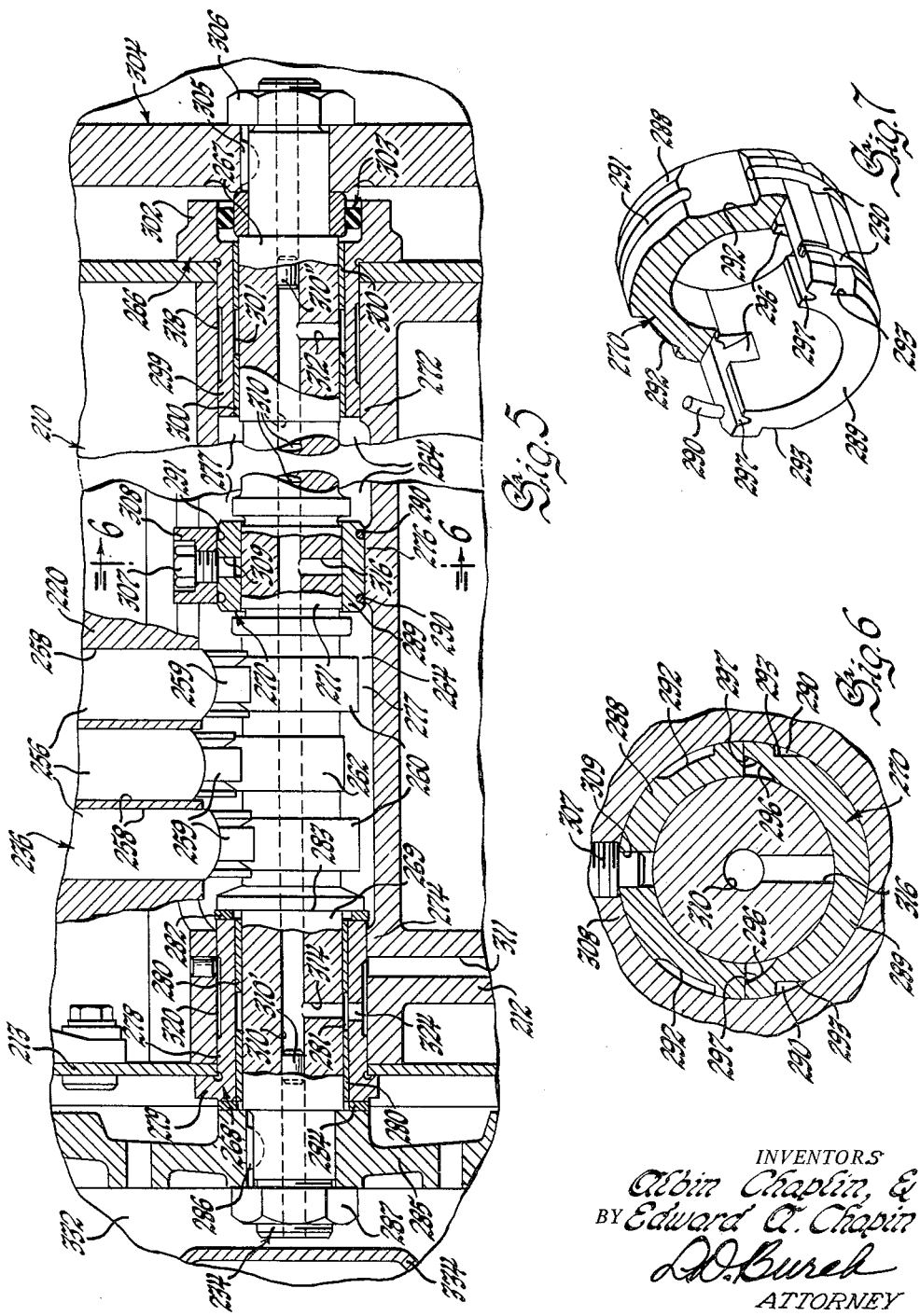
INVENTORS
Albin Chaplin, &
BY Edward A. Chaplin
L.D. Burch
ATTORNEY United States Patent Office 2,956,642
Patented Oct. 18, 1960

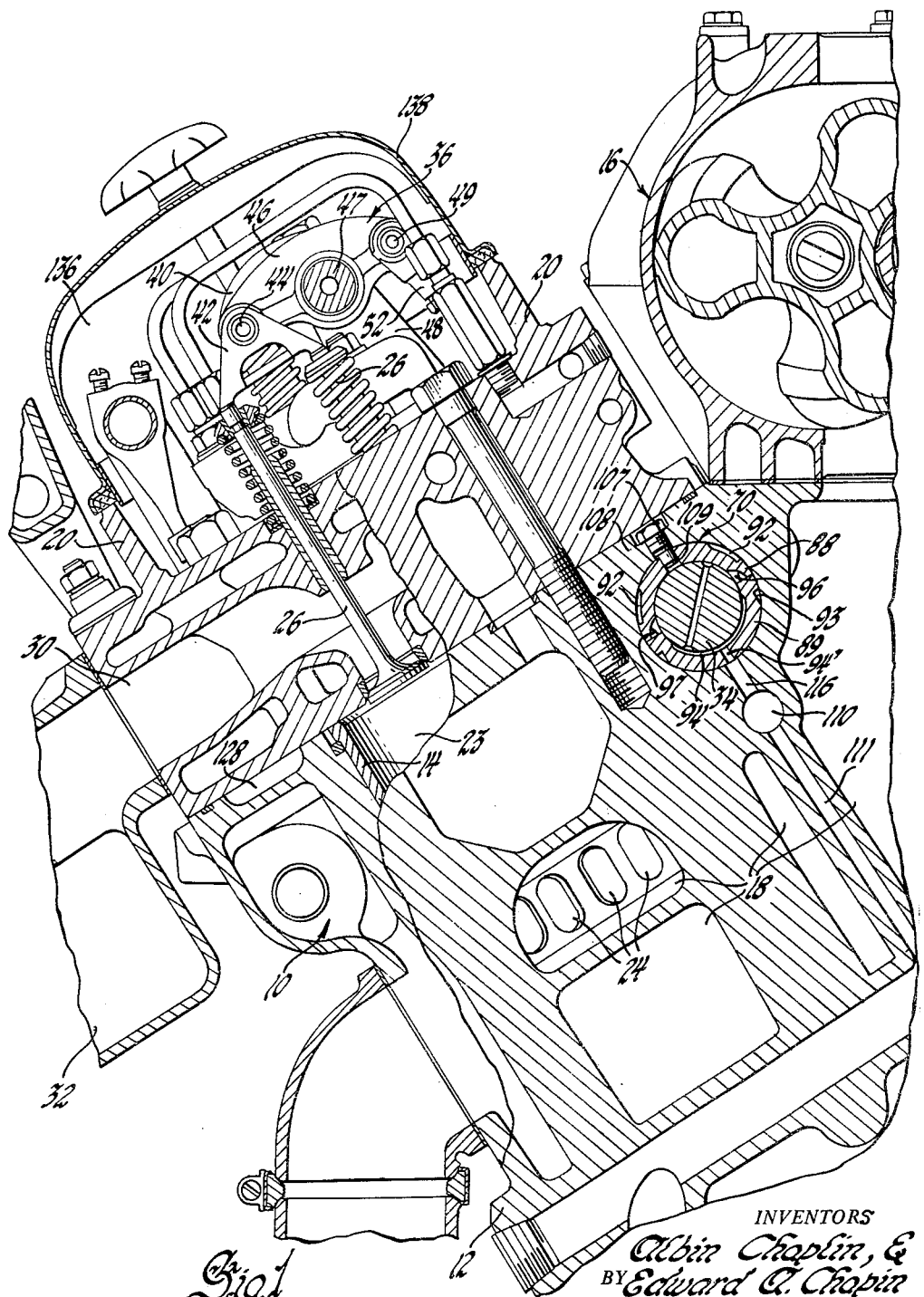

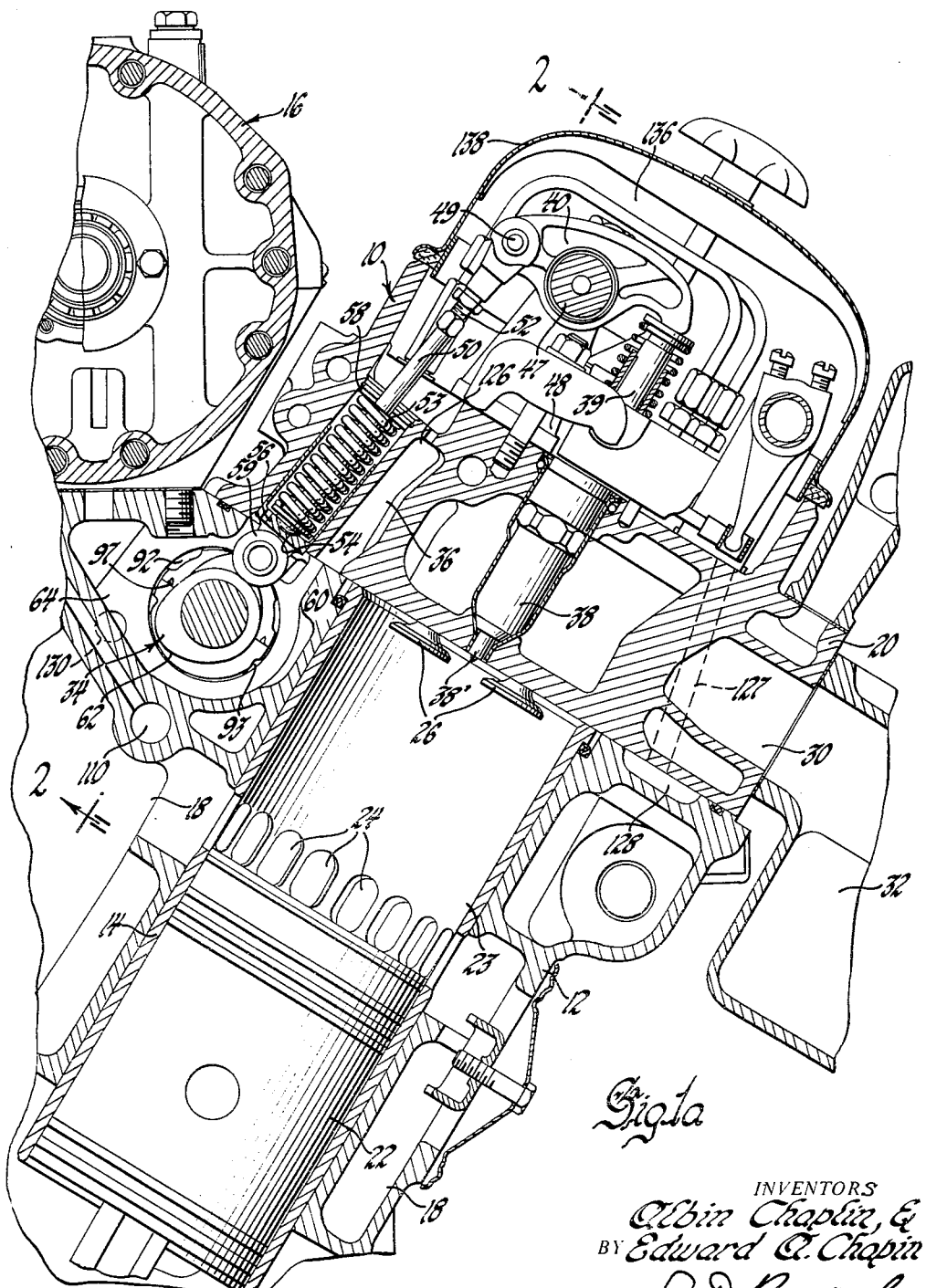

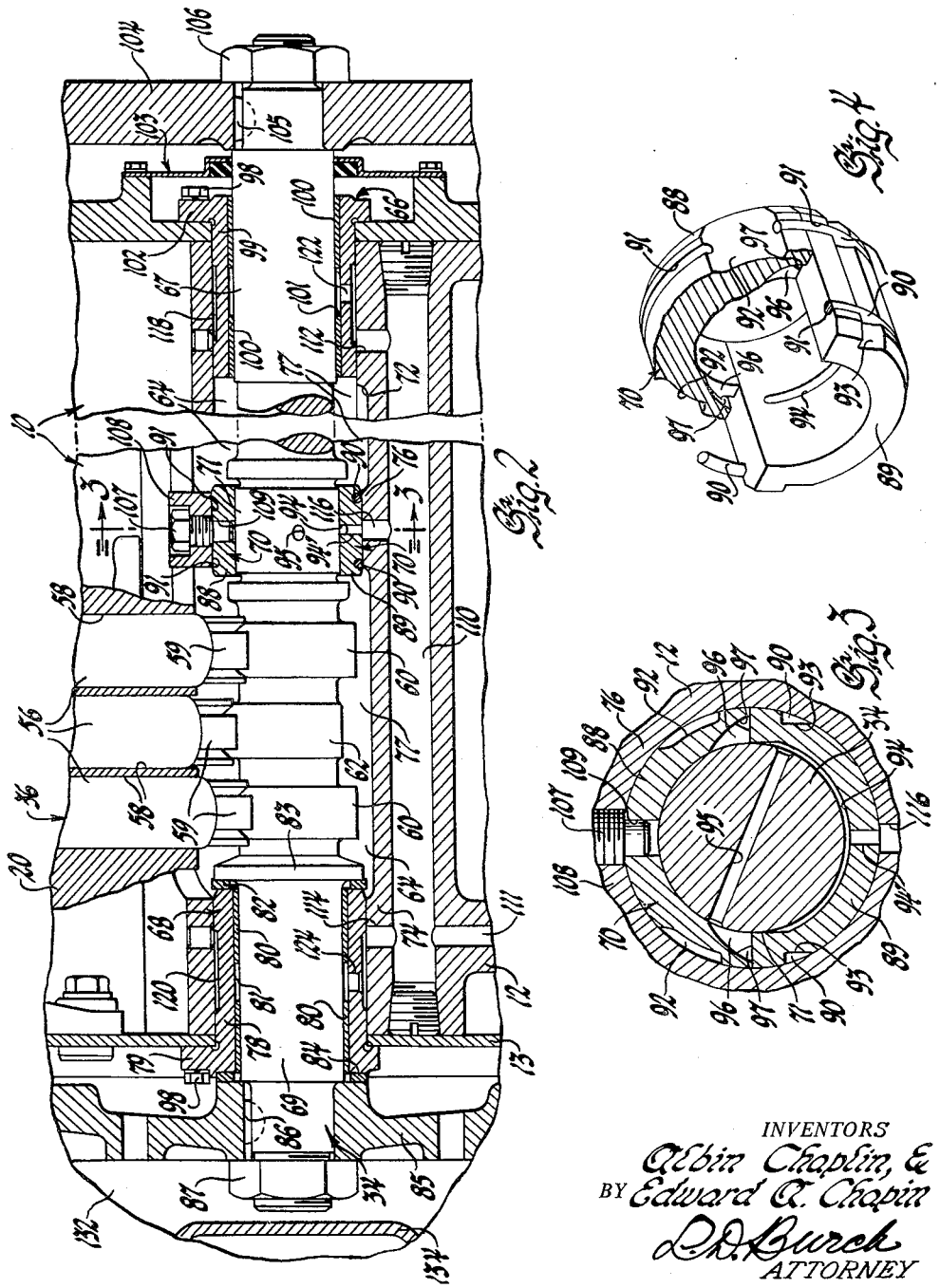

2,956,642

CAMSHAFT AND BEARING LUBRICATING MEANS

Albin Chaplin, Detroit, and Edward A. Chapin, Flat Rock, Mich., assignors to General Motors Corporation, Detroit, Mich., a corporation of Delaware Filed Dec. 23, 1958, Ser. No. 782,587

19 Claims. (Cl. 184—6)

This invention relates generally to means for journalling and lubricating shafts and mechanisms operatively associated therewith, and more particularly to a camshaft and camshaft bearing assembly and to means for insuring adequate lubrication of the journal and cam surfaces of a camshaft and of the parts operated thereby under all operating conditions.

The invention has particular application to the camshafts of internal combustion engines being adapted to insure adequate cam and cam follower or tappet lubrication irrespective of transverse and longitudinal inclination of the engine from a position wherein the camshaft or shafts would be horizontal, such inclination being due either to the mounting requirements or the operating conditions for the engine such as in a motor vehicle or marine installation. Hence, several embodiments of the invention are shown and described herein as embodied in an internal combustion engine for the purpose of illustration. However, the invention is not considered limited to the particular illustrative environment or embodiments, being deemed equally applicable to the journalling of rotating shafts and to the lubrication of such shafts and associated mechanisms generally.

In the illustrative embodiments, the invention contemplates a camshaft and bearing assembly wherein one or more bearings embrace journal portions intermediate and adjacent the ends of the camshaft and cooperate with bearing supporting bosses to divide a camshaft mounting gallery defined by and extending longitudinally of an engine or the like into a plurality of oil collecting pockets or compartments. Several of such bearings are provided with orifice or nozzle openings therein which cooperate with pressurized oil supply passages in the camshaft and engine to sequentially direct jets of oil within the adjacent compartments. The several intermediate bearings serve as oil dam members and cooperate with their respective mounting bosses to define passages draining the oil supplied to the several compartments longitudinally of the gallery and therefrom through suitable passages to the engine crankcase or oil sump.

The bearing defined drain passages normally maintain only a cam lobe immersing level of oil in the several compartments when the engine is shut down or under slow speed engine operation. Under such operating conditions the mounting gallery is connectible to atmosphere through the engine crankcase and the bearing defined oil drain passages consequently serve to vent the several oil collecting compartments. However, under high speed engine operating conditions, oil drainage is sufficiently restricted to permit the oil supplied to the several compartments to build up to a substantially gallery full level. Hence, the oil supplied by the several orifices is normally discharged into a cam lobe immersing head of oil under all level engine operating conditions. However, under low speed or engine starting conditions are where the engine is inclined tending to drain the several compartments below a level permitting proper immersion of the several tappet actuating cams, any orifices above the oil level in the adjacent compartment discharge an atomized oil spray onto the adjacent lobes of the camshaft and cam follower tappets.

The foregoing and other objects, advantages and features of the invention will be better understood from the following description having reference to the several accompanying drawings, wherein:

Figures 1 and 1a are substantially complementary transverse sectional views of upper portions of a V-type two-cycle internal combustion engine embodying an illustrative form of the invention;

Figure 2 is a sectional view taken substantially on the line 2—2 of Figure 1a with the camshaft being shown in elevation with portions thereof broken away and in section;

Figure 3 is an enlarged sectional view taken substantially on the line 3—3 of Figure 2;

Figure 4 is a perspective view of the intermediate camshaft bearing shown in Figures 1–3 with portions thereof broken away and in section;

Figure 5 is a sectional view similar to Figure 2 and shows a modified form of the invention;

Figure 6 is a sectional view similar to Figure 3 and taken substantially on the line 6—6 of Figure 5; and Figure 7 is a perspective view similar to Figure 4 and shows a modified form of intermediate bearing illustrative of the invention as shown in Figures 5 and 6.

Referring more particularly to Figures 1 and 1a of the drawings, an internal combustiton engine of two-cycle, uniflow scavenged design is indicated generally at 10 and comprises a cylinder block 12 defining two V'd inclined banks of cylinders 14 having an included angle of approximately 60°. An engine-driven blower 16 is mounted on top of the cylinder block intermediate the cylinder banks and is adapted to supply the pressurized scavenging and charging air to an air receiving box or chamber 18 which is defined by the cylinder block and extends longitudinally thereof between the V'd cylinder banks embracing the several cylinders. Two cylinder heads 20 are mounted on the upper inclined faces of the cylinder block in flanking relation to the blower. The cylinder heads close the upper ends of the several cylinders and cooperate with pistons 22 reciprocably mounted therein to define a plurality of expansible combustion chambers 23.

The several pistons are connectible in a conventional manner to the engine crankshaft, not shown, and their reciprocation serves to control the admission of scavenging and charging air to their respective cylinders through intake ports 24 which open to the air box 18. Four exhaust valves 26 per cylinder are reciprocably mounted in the cylinder heads and control the opening of ports leading to exhaust passages 30 which are in turn connected to the exhaust manifolds 32 of the engine. The exhaust valves 26 for the several cylinders are operated in timed sequence by camshafts 34 through valve actuating mechanisms 36 of the overhead rocker arm type to provide substantially simultaneous opening of the intake and exhaust ports with uniflow scavenging of the exhaust gases from the several cylinders through exhaust passages 30.

Fuel injectors 38 are mounted in the cylinder head axially of each of the several cylinders. The injectors 38 each have a fuel injecting nozzle 38' projecting centrally of the expansible combustion chambers 23 of their respective cylinders and are adapted to supply the fuel charges thereto in timed sequence by actuation of a conventional valve or pump controlling plunger 39 by a suitable cam-operated rocker arm 40.

The valve actuating mechanisms each include a clevis bridge member 42 which is pivotally connected at 44 to one end of a rocker arm 46 and has two pallet arms thereon thrustably engageable with the adjacent stem ends of two of the exhaust valves 26. The several rocker arms 40 and 46 for the injectors and exhaust valves of each cylinder are pivotally supported on a shaft 47 which is in turn supported by spaced bracket members 48 carried by the cylinder head. The ends of the rocker arms 40 and 46 distal from the valve stems and injector plunger 39 are each pivotally connected at 49 to the upper end of a two-piece push rod 50. The length of the push rod 50 is adjustable by a threaded connection indicated at 52 to provide for the adjustment of lash in the valve and injector actuating mechanisms. The lower end of each push rod 50 is resiliently biased by a spring 53 into thrust engagement with a spherical seat 54 formed within a cam follower tappet member 56. The several tappets are reciprocably mounted in suitable bores 58 extending through the cylinder head and carry cam follower rollers 59 which thrustably engage suitable valve and injector actuating cam lobes 60 and 62 spaced longitudinally of the camshafts 34.

The camshafts 34 are mounted in two spaced parallel galleries 64 defined by and extending longitudinally of the engine block. As shown in Figure 2, the camshafts 34 are journaled by front and rear end bearing assemblies 66 and 68 and a number of intermediate bearing assemblies 70 which are in turn supported by bosses 72, 74 and 76, respectively, spaced longitudinally of the camshaft gallery 64. The end bearings 66 and 68 engage journal surfaces 67 and 69 adjacent the front and rear ends of the camshaft and the intermediate bearing assemblies 70 engage journal surfaces 71 provided on the camshaft intermediate the valve and injector actuating cam lobes 60 and 62 for the several cylinders of their respective banks. The several bearings and their supporting bosses thus divide the camshaft gallery 64 into a plurality of oil receiving compartments or pockets 77.

Each rear camshaft bearing assembly 68 is mounted on the rear journal portion 69 of the camshaft prior to its mounting in the camshaft gallery and includes a cylindrical sleeve member 78 having a radially extending flange 79 adjacent the rear end thereof adapted to be secured to the rear of the engine block in abutment with an end plate 13. The sleeve member 78 carries two annular bushings 80 which are axially spaced to define an inwardly facing, annular oil receiving groove 81 therebetween. The end of the sleeve 78 opposite the flange 79 abuts an annular thrust bearing member 82 which in turn thrustably engages an annular shoulder 83 formed on the camshaft intermediate its rear journal portion 69 and the adjacent valve actuating cam 60. A second thrust bearing washer 84 is interposed between the flanged end of the sleeve member 78 and an engine-driven camshaft timing gear 85 which is drivingly secured to the rear end of the camshaft 34 by a key 86 and a nut 87 threadable thereon.

As best shown in Figures 3 and 4, the intermediate bearing assemblies 70 each include upper and lower bearing halves 88 and 89, respectively, which are assembled on the several intermediate camshaft journal surfaces 71 with their diametrical end faces in abutment by two C-shaped wire clips 90 prior to mounting each camshaft in its respective mounting gallery. The wire clips 90 are mounted in aligned parallel spaced grooves 91 extending circumferentially of the mating bearing halves with the ends of the clips 90 engaging only the ends of the grooves 91 in the upper half and the intermediate portion thereof embracing and securing the lower bearing half thereto. The upper bearing halves 88 each have two longitudinally extending grooves 92 cooperating with the several intermediate bearing supporting bosses 76 to define parallel oil drain passages interconnecting the oil receiving pockets 77. Two similar parallel grooves 93 extend longitudinally of the lower halves and intersect the circumferentially extending grooves 91. However, when the intermediate bearings are assembled on their respective camshafts and mounted in the galleries 64, oil drainage through the grooves 93 is substantially restricted or sealed off by the wire clips 90. The grooves 92 and 93 provide shoulders for clamping and referencing the bearing halves during required machining operations.

Each lower bearing half 89 has an arcuately extending oil receiving groove 94 opening on its inner bearing surface and terminating in spaced relation to the diametrically extending faces thereof. The grooves 94 are each connectable to the pressurized oil supply system of the engine as explained in greater detail below and sequentially register with opposite ends of passages 95 which are drilled diametrically through each of the camshaft journal portions 71. Each drilled passage 95 alternately connects the groove 94 with radially extending slots 96 which are formed in the upper bearing half 88 and intersect its diametrical faces mating with the lower bearing half. Narrow slots or grooves 97 extending longitudinally of and intersecting the radial slots 96 and the diametrical faces of each upper bearing half cooperate with the mating faces of the lower half to form jet nozzles for sequentially shooting or spraying oil longitudinally into the several oil receiving compartments 77 and onto the adjacent cam lobes 60 and 62.

After assembly of the rear and intermediate bearing assemblies on the camshaft and its insertion in its respective mounting gallery, the bearing flange 79 is secured to the end plate 13 and rear of the block by suitable means such as by bolts 98. The several intermediate bearings are then nonrotatably secured by locking screws or bolts 107. The bolts 107 threadably engage bearing supporting bridges 108 which are integral of the block and pass over the camshaft galleries 64. A reduced diameter end portion on each bolt 107 engages a radial bore 109 provided therefor in each upper bearing half. The front camshaft bearing is then slidably inserted between the front camshaft journal portion 67 and the corresponding bearing supporting boss 72. The front bearing 66 is similar to the rear bearing 68 in that it comprises a sleeve portion 99 carrying two axially spaced bushings 100 defining an inwardly facing oil receiving groove 101 therebetween and having a flanged end portion 102 by which the front bearing 66 is secured to the front of the cylinder block 12 by bolts 98. The projecting end of the camshaft is sealed with respect to the cylinder block by a suitable seal assembly shown somewhat diagrammatically at 103. A member 104 such as an engine balance weight or an accessory drive pulley or gear is secured to the front end of the camshaft by a key 105 and a nut 106 threadable thereon.

Two camshaft lubricating galleries 110 extend longitudinally of the block in close parallel relation to the camshaft mounting galleries and are connected to the pressurized oil supply of the engine by passages 111 adjacent the rear of the block. Branch passages 112, 114 and 116 interconnect the galleries 110 to the bearing supporting surfaces of the several bosses 72, 74 and 76, respectively. The branch passages 112 and 114 mate with grooves 118 and 120 which are formed circumferentially of the front and rear camshaft bearings 66 and 68, respectively. The grooves 118 and 120 are connected to the bushing defined oil receiving grooves 101 and 81 by radial ports 122 and 124 extending through the camshaft bearings 66 and 68, respectively. Each of the branch passages 116 similarly mates with a radial port 94' which extends through the lower half 89 of the adjacent intermediate bearing assembly 70 and opens inwardly on the arcuately extending groove 94 therein facing the intermediate camshaft journal surface 71.

The oil supplied directly to the compartments 77 by the jet nozzle grooves 97 is supplemented by that supplied to the several journal surfaces and to some extent by any drainage of oil supplied to the overhead valve and injector actuating mechanisms. Such oil drainage occurs through the tappet assembly and drain passages 126 provided in the inclined upper end of the cylinder head. The substantial remainder of the oil supplied to the overhead valve and injector actuating mechanisms is drained from the troughs defined by the low side of the cylinder heads through suitable passages 127 extending through the head to drain galleries 128 extending longitudinally between the cylinder block and heads from which it is returned to the crankcase of the engine through suitable passages, not shown, preferably extending therebetween adjacent the front and rear of the block. When the oil supplied to the several compartments 77 is above levels determined by the grooves 92, the oil overflows through the grooves longitudinally toward the ends of the camshaft gallery from which it drains through suitable passage means to the crankcase of the engine. At the rear of the engine, such passage means includes ports 130 in the end plate 13, as shown in Figure 1a, which connect the rear gallery compartments 77 to a timing gear housing compartment 132, shown in Figure 2, defined between the rear end plate 13 and a gear cover member 134 and therethrough to the crankcase of the engine. The drain galleries 128 may be similarly connected to the engine crankcase by suitable ports mating therewith and extending through the rear end plate 13.

As indicated above, the several intermediate bearing assemblies 70 serve as oil dam members which under level engine operating conditions normally maintain at least a minimum cam lobe immersing level of oil in the several compartments 77 during engine shutdown, starting and slow speed operation. Rotation of the camshaft under such engine operating conditions results in sequential immersion of the cam lobes 60 and 62 in the bearing maintained minimum oil level with resultant centrifugal splashing of the oil tending to properly lubricate the mating cam and tappet rollers. In the illustrative environment and embodiments of the invention, as shown in Figures 1 and 1a, where the diametrical mating faces of the bearing halves 88 and 89 are inclined to the horizontal, one of the jet orifice grooves 97 is normally below and the other is above the dam maintained minimum oil level. Under such minimum oil level operating conditions, the oil delivered by the lower of such orifice grooves thus normally discharges into the collected oil while the orifice grooves above the oil level in the adjacent compartments discharge atomized oil spray onto and further insure proper lubrication of the adjacent lobes of the camshaft and cam follower tappets.

In installations having operational or mounting transverse or longitudinal inclination of the engine, such as in motor vehicles, such inclination may result in a substantial reduction in the minium oil level maintained within the several pockets under engine starting or low speed operating conditions. The relative inclination of the camshaft to this reduced oil level may prevent immersion of one or more of the cam lobes 60 and 62 and in certain extreme cases may preclude any cam lobe immersion. Under such adverse operating conditions, the several cam lobe surfaces and the tappet rollers 59 mating therewith will generally be lubricated by the atomized oil spray sequentially emitted from the jet nozzle grooves 97 above the oil levels in the several compartments 77. It should be noted that the roller supporting arms of the tappets 56 are beveled to permit such oil spray to reach the journals of the several tappet rollers.

Oil drainage from the several compartments 77 is limited initially to the lower groove defined drain passages 92 and is sufficiently restricted by the size of such passages to permit the oil supplied to the several compartments to build up with increasing engine speed to a level where the supplied oil begins to overflow through the upper groove defined passages 92. With still further increases in engine operating speed, the provided drain restriction permits the supplied oil to further build up to a substantially gallery full level at maximum engine speed operating conditions. Consequently, as the oil levels in the several compartments 77 rise with continued operation at higher engine speeds, the upper orifice grooves 97 are eventually submerged after which lubrication is effected only by cam immersion and splashing. In this manner aeration of the oil supplied for camshaft lubrication is minimized under higher engine speed operating conditions since the several orifice grooves 97 normally discharge directly into the compartment collected head of oil.

In level engine installations where minimum oil level cam immersion and splash is deemed to provide sufficient low speed and starting lubrication, the diametrical mating faces and orifice grooves of the bearing halves may be disposed horizontally similar to the showing of Figure 3. In such installations, the oil supplied by the several orifice grooves is normally discharged into the compartment collected head of oil under all engine operating conditions thereby preventing or minimizing the aeration of the oil supplied for camshaft lubrication. An engine having the bearing ends thus horizontally disposed for an intended level engine usage may, of course, be used safely in installations where the engine is inclined transversely or longitudinally; adequate lubrication of the cam lobes and tappets being insured by the atomized oil spray emitted from the jet nozzle orifices above the resultant lower cam pocket oil level under engine starting and slow speed operation.

In accordance with conventional engine practice, the crankcase of the engine is connectible to the atmosphere through suitable engine crankcase breathing means, not shown. The oil drain passages from the cylinder head through the tappet assemblies and passages 126 and 127 through the oil drain galleries 128 and therefrom to the crankcase of the engine thus serve to ventilate the several camshaft gallery compartments 77 and the valve and injector rocker housing compartments 136 which are defined between the cylinder heads 20 and cover members 138. Under engine operating conditions where the upper drain grooves 92 are not completely submerged by the oil level within the several camshaft gallery compartments, the bearing defined oil drain passages further serve to vent the several oil collecting compartments directly through the timing gear compartments to the crankcase.

In the form of the invention shown in Figures 5–7, the various component elements are generally identical with or correspond structurally and functionally to similar elements shown and described above in relation to the embodiment of Figures 1–4. Except for the structural differences noted below, such corresponding elements need not be described in detail and are identified in the several figures by a reference numeral derived by the addition of 200 to the corresponding reference numeral of the previous described embodiment. Thus the engine is properly designated by the reference numeral 210, the camshafts 234, the camshaft mounting galleries 264 and the front, rear, and intermediate bearing assemblies 266, 268 and 270, respectively.

In this form of the invention, the camshafts 234 are center drilled and plugged adjacent each end thereof at 310' and 310" to provide a central oil supply gallery 310 extending longitudinally thereof. The galleries 310 are each connected through a radial branch passage 314 in the rear journal portion of their respective camshafts to oil supply passages 311 adjacent the rear of the engine block. The oil supply passages 311 are each connectible to the engine oil supply system of the engine and continuously supply pressurized oil to the bushing defined annular grooves 281 of the rear camshaft bearings 268 through circumferential grooves 320 and radial ports 324 in the rear bearing sleeves 278. The front and intermediate camshaft journal portions 267 and 271, respectively, are each provided with radial branch passages 312 and 316 which serve to continuously meter the supplied lubricating oil to the journal surfaces of the front and intermediate bearings 266 and 270, respectively.

As in the first embodiment, the intermediate bearings are each split diametrically and include upper and lower halves 288 and 289 which are assembled on the several intermediate camshaft journal portions 271 by C-shaped wire clips 290. Upon rotation of the camshafts, the radial branch passages 316 in each intermediate journal portion of the camshaft sequentially registers with ports defined by radially extending slots 296 intersecting the diametrical end faces of the lower bearing halves 289 and with longitudinally extending slots or grooves 297 therein which intersect the port slots 296 and the diametrical end faces thereof. The grooves 296 and 297 cooperate with the adjacent faces of the upper bearing halves to form jet nozzles sequentially discharging oil into the several camshaft gallery compartments 277 and, when permitted by the oil level in the several compartments, spraying such oil onto the adjacent cam lobes 260 and 262. Adequate lubrication of the journal and cam surfaces of the camshaft and elements actuated thereby is thus provided under all engine operating conditions in substantially the same manner as with the previously described embodiment. Similarly, overflow drainage of the supplied oil from the several oil receiving gallery pockets 277 is effected through passages defined by the intermediate bearing supporting bosses 276 and bearing defined grooves 292.

While only two embodiments of the invention have been shown and described herein for illustrative purposes, it will be appreciated by those skilled in the art that various modifications might be made therein without departing from the scope and spirit of the invention as defined in the following claims.

We claim:

1. In an internal combustion engine having a camshaft mounting gallery extending longitudinally therethrough, a camshaft rotatably mountable in said gallery, said camshaft having longitudinally spaced journal portions thereon and at least one cam lobe adapted to actuate cam following tappets intermediate the spaced journal portions thereon, a plurality of bearings rotatably embracing and mounting said journal portions within said gallery and dividing said gallery into lubricant receiving compartments, means for supplying pressurized lubricant, at least one bearing having a port therein opening on its bearing surface and having a nozzle orifice intersecting and extending longitudinally from said port and opening on an adjacent compartment, passage means including at least one passage in said camshaft adapted to intermittently interconnect said supply means with said port whereby lubricant is intermittently discharged from said nozzle orifice into the adjacent lubricant receiving compartment, and drain passage means for normally draining lubricant above a predetermined minimum cam lobe immersing level from said compartment, said drain passage means being connected to said compartment above said nozzle orifice.

2. In an internal combustion engine having a camshaft mounting gallery extending longitudinally therethrough, a camshaft rotatably mountable in said gallery, said camshaft having longitudinally spaced journal portions thereon adjacent and intermediate the ends thereof and a plurality of cam lobes adapted to actuate cam following members intermediate the spaced journal portions thereon, a plurality of bearings rotatably embracing and mounting said journal portions within said gallery and dividing said gallery into a plurality of lubricant receiving compartments, means for supplying pressurized lubricant, at least one bearing adjacent each compartment having a port therein opening on its bearing surface and a nozzle orifice intersecting and extending longitudinally from said last-mentioned port and opening on an adjacent compartment, passage means including at least one passage in said camshaft adapted to intermittently interconnect said supply means with said port whereby lubricant is intermittently discharged from said nozzle orifice into the adjacent lubricant receiving compartment, and drain passage means for normally draining lubricant above a predetermined minimum cam lobe immersing level from said compartment, said drain passage means being connected to said compartment above said nozzle orifice.

3. In a mechanism having a bore therein, a shaft, spaced bearings rotatably embracing and mounting said shaft within said bore and cooperating with said bore to define a lubricant receiving compartment, means operably connected to said shaft within said compartment and adapted to be actuated by rotation of said shaft, means for supplying pressurized lubricant, at least one of said bearings having a port therein and an orifice extending longitudinally to interconnect said last-mentioned port with said compartment, passage means including a passage in said shaft adapted to intermittently interconnect said supply means with said port whereby lubricant is intermittently discharged from said orifice into the lubricant receiving compartment, and drain means for draining lubricant from said compartment above a predetermined level, said predetermined level being sufficient to permit splash lubrication of said shaft actuated means and said drain means being connected to said compartment above said nozzle orifice whereby said lubricant is normally discharged into the collected lubricant within said compartment when the lubricant level is above said orifice and is sprayed directly onto the operable connection between said shaft and shaft actuated means when the lubricant level in said compartment is below said orifice.

4. In an internal combustion engine having a camshaft mounting gallery extending longitudinally therethrough, a camshaft rotatably mountable in said gallery and having longitudinally spaced journal portions thereon adjacent and intermediate the ends thereof and cam lobes thereon intermediate the several journal portions, annular bearing assemblies rotatably embracing and mounting said journal portions within said gallery and dividing said gallery into a plurality of lubricant receiving compartments, the bearing assemblies journalling said intermediate portions each include two mating bearing segments, means for mounting said bearing segments on said intermediate journal portions prior to insertion of the camshaft in said camshaft gallery, means for supplying pressurized lubricant, the mating ends of the bearing segments of each intermediate bearing assembly defining ports therebetween opening on the bearing surface and further defining longitudinally extending nozzle orifices therebetween intersecting said port and opening on said adjacent compartments, passage means including a passage in each intermediate journal portion of said camshaft adapted to sequentially interconnect said ports with said supply means whereby lubricant is sequentially discharged from said nozzle orifices into said lubricant receiving compartments.

5. In the combination set forth in claim 4, passage means defined between said intermediate bearing segments and the adjacent bearing supporting surfaces of said gallery for draining lubricant from said compartments above a predetermined level.

6. In the combination set forth in claim 5, the mating orifice defining ends of the several intermediate bearing segments being disposed substantially horizontally.

7. In the combination set forth in claim 5, the mating orifice defining ends of the several intermediate bearing segments being inclined to the horizontal thereby disposing the several orifices in each intermediate bearing assembly vertically of each other.

8. In the combination set forth in claim 6, said drain passage means being defined between the upper bearing segments and the bearing supporting surfaces of said gallery.

9. In the combination set forth in claim 7, said drain passage means being defined between the upper bearing segments and the bearing supporting surfaces of said gallery.

10. In the combination set forth in claim 5, the mating orifice defining ends of the several intermediate bearing segments being inclined to the horizontal thereby disposing the several orifices in each intermediate bearing assembly vertically of each other, said upper bearing segments each having two longitudinally extending grooves opening outwardly on opposite sides thereof, and said drain passage means being defined in part by passages formed by said grooves in cooperation with the mating bearing supporting surfaces of said gallery, said groove defined drain passages being disposed vertically of each other.

11. In an internal combustion engine having a camshaft mounting gallery extending longitudinally therethrough, a camshaft rotatably mountable in said gallery and having longitudinally spaced journal portions thereon adjacent and intermediate the ends thereof, annular bearing assemblies rotatably embracing and mounting said journal portions within said gallery and dividing said gallery into a plurality of lubricant receiving compartments, the bearing assemblies journalling said intermediate portions each including mating bearing segments, means for mounting said bearing segments on said intermediate journal portions prior to insertion of the camshaft in said camshaft gallery, means for supplying pressurized lubricant to the bearing supporting surfaces of said gallery, one segment of each of said intermediate bearing assemblies having a first port therein connectible radially outwardly to said lubricant supply means and opening inwardly on an arcuately extending groove opening on the bearing surface of said segment, said one bearing segment and a bearing segment mating with at least one end thereof defining a second port therebetween opening on the bearing surface and further defining a longitudinally extending orifice therebetween intersecting said second port and opening toward said adjacent compartments, and the intermediate journal portions of said camshaft each having a passage extending therethrough adapted to intermittently interconnect said arcuately extending groove and said second port whereby lubricant is intermittently discharged from said orifice into said lubricant receiving compartments.

12. In an internal combustion engine having a camshaft mounting gallery extending longitudinally therethrough, a camshaft rotatably mountable in said gallery and having longitudinally spaced journal portions thereon adjacent and intermediate the ends thereof and cam lobes thereon intermediate the several journal portions, annular bearing assemblies rotatably embracing and mounting said journal portions within said gallery and dividing said gallery into a plurality of lubricant receiving compartments, the bearing assemblies journalling said intermediate portions each including two mating bearing segments, means for mounting said bearing segments on said intermediate journal portions prior to insertion of the camshaft in said camshaft gallery, means for supplying pressurized lubricant, one segment of each of said intermediate bearing assemblies having an arcuately extending port therein opening on the bearing surface of said segment and connected to said lubricant supply means, the mating ends of said bearing segments defining ports therebetween opening on the bearing surface and further defining longitudinally extending nozzle orifices therebetween intersecting said last-mentioned ports and opening on the adjacent compartments, and the intermediate journal portions of said camshaft each having a passage extending therethrough adapted to sequentially interconnect said arcuately extending groove and said last-mentioned ports whereby lubricant is sequentially discharged from said nozzle orifices into said lubricant receiving compartments.

13. In the combination set forth in claim 12, passage means defined between said intermediate bearing segments and the adjacent bearing supporting surfaces of said gallery for draining lubricant from said compartments above a predetermined level.

14. In the combination set forth in claim 13, the mating orifice defining ends of the several intermediate bearing segments being disposed substantially horizontally.

15. In the combination set forth in claim 13, the mating orifice defining ends of the several intermediate bearing segments being inclined to the horizontal thereby disposing the several orifices in each intermediate bearing assembly vertically of each other.

16. In the combination set forth in claim 14, said drain passage means being defined between the upper bearing segments and the bearing supporting surfaces of said gallery.

17. In the combination set forth in claim 15, said drain passage means being defined between the upper bearing segments and the bearing supporting surfaces of said gallery.

18. In the combination set forth in claim 13, the mating orifice defining ends of the several intermediate bearing segments being inclined to the horizontal thereby disposing the several orifices in each intermediate bearing assembly vertically of each other, said upper bearing segments having two longitudinally extending grooves opening outwardly thereof, and said drain passage means being defined in part by passages formed by said grooves in cooperation with the mating bearing supporting surfaces of said gallery, said passages being disposed vertically of each other.

19. In an internal combustion engine, a frame member having a camshaft gallery extending therethrough with a plurality of annular bearing supporting bosses spaced longitudinally thereof and adjacent each end of said frame member, lubricant supply means including passages in said frame member connecting said supply means to ports opening on the bearing supporting surfaces of each of said bosses, a camshaft mountable in said gallery and having journal portions thereon in spaced radial relation to said annular bosses, cylindrical sleeve bearings mounted in the annular bosses immediately adjacent the ends of said frame member and rotatably embracing the end journal portions of said camshaft, said sleeve bearings each having a radial flange thereon secured to the adjacent end of said frame member and having circumferential grooves therein connectible with the ports of their respective mounting bosses and radial ports therein extending to an annular groove opening inwardly on their camshaft journalling surfaces, said camshaft having an annular boss or flange within the frame member in thrust bearing relation to the end of one of said sleeve bearings opposite its flanged end, a shoulder defining member removably secured to the adjacent end of the camshaft in thrust bearing relation with the flanged end of said one bearing, an annular bearing assembly mounted within each of said intermediate bearing supporting bosses and rotatably embracing the adjacent journal portion of said camshaft, each of said intermediate bearing assemblies comprising bearing segments and means for mounting said bearing segments on said intermediate journal portions prior to insertion of the camshaft in said camshaft gallery, one of said segments of each intermediate bearing assembly having a radial port therein connectible with the adjacent supply port and opening inwardly on an arcuately extending groove opening on its bearing surface, the bearing segment mating therewith having at least one slot therein radially intersecting its bearing surface and the surface thereof mating with said one bearing segment and having a groove extending longitudinally thereof and opening on its surface mating with said one bearing half and intersecting said slot, and the intermediate journal portions of said camshaft each having a diametrical passage extending therethrough in the plane of said arcuately extending groove in said one half and the slot in said mating half whereby lubricant is intermittently delivered to said slot from said arcuately extending groove and is intermittently squirted from the orifice defined between the longitudinally extending groove in the mating bearing half and the mating surface of said first bearing half.

References Cited in the file of this patent

UNITED STATES PATENTS

| | | |
|---|---|---|
| 1,102,605 | Pembroke | July 7, 1914 |
| 1,119,351 | Daimler | Sept. 26, 1916 |
| 1,264,494 | D'Orville | Apr. 30, 1918 |
| 1,266,288 | Loomis | May 14, 1918 |